United States Patent [19]

Shimizu

[11] 4,392,716
[45] Jul. 12, 1983

[54] MECHANISM TO MAINTAIN CONSTANT BODY TUBE LENGTH OF BINOCULAR MICROSCOPE

[75] Inventor: Tsutomu Shimizu, Hanno, Japan

[73] Assignee: Olympus Optical Co., Ltd., Tokyo, Japan

[21] Appl. No.: 255,219

[22] Filed: Apr. 17, 1981

[30] Foreign Application Priority Data

Apr. 22, 1980 [JP] Japan .................. 55-53894[U]

[51] Int. Cl.³ .................. G02B 21/20; G02B 27/10
[52] U.S. Cl. .................... 350/145; 350/287
[58] Field of Search ............ 350/75, 76, 145, 146, 350/35, 287, 173, 514

[56] References Cited

FOREIGN PATENT DOCUMENTS 31-8187 of 1956 Japan .......................... 350/145
692388 of 1953 United Kingdom .......... 350/145

Primary Examiner—Jon W. Henry
Attorney, Agent, or Firm—Parkhurst & Oliff

[57] ABSTRACT

The disclosed mechanism maintains a constant body tube length in a binocular microscope, by keeping a constant distance from a ray dividing prism secured to a casing of the microscope to each of oculars secured to ocular sleeves slidably mounted on said casing. Two outer frames are mounted on said casing in such a manner that they are movable laterally to axial direction of incident light ray to said ray dividing prism, and each of said ocular sleeves is movable in the corresponding one of said outer frames in the axial direction thereof. Each ocular sleeve has a pin, which pin fits in both an axial slot bored through the outer frame extending in said axial direction and a slant slot bored through said casing with an angle of 45° relative to said axial direction. Whereby, when pupillarly distance is modified by laterally moving the outer frames, the ocular sleeves are axially displaced by corresponding distances.

5 Claims, 5 Drawing Figures

MECHANISM TO MAINTAIN CONSTANT BODY TUBE LENGTH OF BINOCULAR MICROSCOPE

BACKGROUND OF THE INVENTION

1. Field of the Invention

This invention relates to a mechanism to maintain a constant body tube length of a binocular microscope, the body tube length being a distance from an objective lens or a ray dividing prism to an ocular lens of the binocular microscope.

2. Description of the Prior Art

A typical binocular microscope of the prior art has a ray dividing prism and two prisms receiving light rays from the ray dividing prism so as to refract the received light rays by 90° toward two ocular lenses. If the pupillary distance between the two ocular lenses is modified by merely adjusting the spacing therebetween, the distance from the ray dividing prism to the ocular lenses is changed. Thus, the modification of the pupillary distance is inevitably accompanied with a change in the body tube length.

Various mechanisms to maintain a constant body tube length of the microscope are known. In a mechanism disclosed by the Japanese Pat. No. 8,187/1956, pins are secured to two ocular sleeves of a microscope, and the two pins are guided by two linear cam grooves slanted symmetrically on opposite sides with angles of 45° relative to the optical axes of the ocular sleeves, so that when the pupillary distance is modified, the ocular sleeves are displaced in the axial directions thereof. This mechanism of the prior art is simple in construction but has a shortcoming in that backlashes are caused by gaps between the coacting linear cam grooves and the pins. It is apparent that when the backlash exists, accurate displacements of the ocular sleeves in the directions of the optical axes thereof in response to modification of the pupillary distance are impossible to achieve. Accordingly, the body tube length of the microscope cannot be maintained constant in the mechanism of the prior art.

To maintain the body tube length accurately constant is particularly important in microscopes of the type in which photographs are taken by focussing through adjustment of the ocular lenses of the body tube thereof. If there should be an error in the body tube length, even if focussing is done with the ocular lens of the body tube, the photographs may be blurred.

SUMMARY OF THE INVENTION

Therefore, an object of the present invention is to obviate the aforesaid shortcoming of the prior art, by providing an improved mechanism to accurately maintain a constant body tube length in binocular microscopes through elimination of backlashes between pins connected to ocular sleeves and linear cam grooves coacting with the pins.

To fulfil the aforesaid object, in a mechanism to maintain a constant body tube length of a binocular microscope having a casing with two outer frames mounted thereof in a slidable manner in a width direction of the microscope, two ocular sleeves carried by said outer frames in a manner slidable in an axial direction thereof, oppositely slanted linear cam grooves bored on said casing with angles of 45° relative to said axial direction, and pins connected to said ocular sleeves and fitted in said linear cam grooves respectively, said ocular sleeves being adapted to slide axially relative to the outer frames in response to symmetrical widthwise sliding of said outer frames relative to the casing so as to maintain said body tube length constant; the present invention is characterized in that slots are bored through said outer frames so as to extend in the axial direction thereof and to slidably receive said pins connected to said ocular sleeves, and that resilient means applys axial forces to said two ocular sleeves in axially opposite directions.

BRIEF DESCRIPTION OF THE DRAWINGS

For a better understanding of the invention, reference is made to the accompanying drawings, in which.

Throughout the drawings, 1 is light ray, 2, 3 are cemented prisms, 4, 5 are prisms, 6 is a holder frame, 7 is a casing, 8, 9 are outer frames, 10, 11 are ocular sleeves, 12 is an outer sliding surface, 13, 14 are male dovetails, 15, 16 are dovetail grooves, 17, 26 are arms, 18, 27 are pins, 19, 21 are rear extensions, 20, 28 are slots, 22, 29 are linear cam grooves, 23, 30 are rod-like resilient members, 24 is an inner sleeve, 25 is a knob, and 31, 32 are covers.

DESCRIPTION OF THE PREFERRED EMBODIMENT

Figure 1:
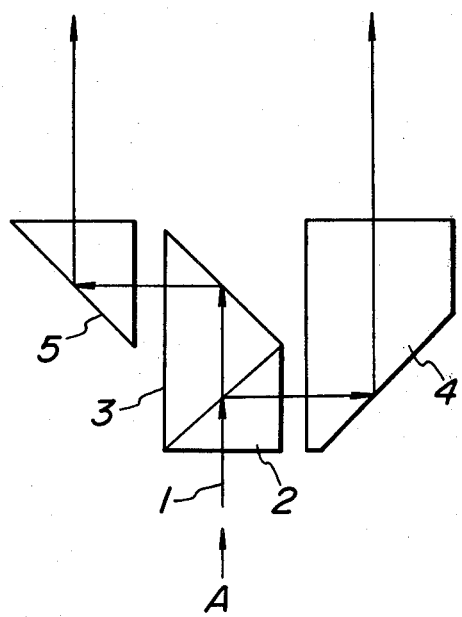
FIG. 1 is a diagram of an optical prism system of a binocular microscope to which the present invention is applied.

In a typical optical prism system of binocular microscope shown in FIG. 1, light ray 1 from an objective lens which is not shown becomes incident to cemented prisms 2 and 3 as illustrated by the arrow A of the figure. The cemented prisms 2 and 3 divide the incident light ray and refract it by 90° both to the left and the right, as seen in the figure. The refracted light rays are directed to prisms 4 and 5, where the light rays are refracted again by 90° so as to become parallel to the incident light ray 1 to the optical system. The light rays from the prisms 4 and 5 become incident to ocular lenses which are not shown. If the two prisms 4 and 5 are interlocked and moved in a width direction (i.e., the left-and-right direction in FIG. 1), the pupillary distance of the binocular microscope can be modified, but the body tube length is changed unless a suitable adjustment is provided for.

Figure 2:
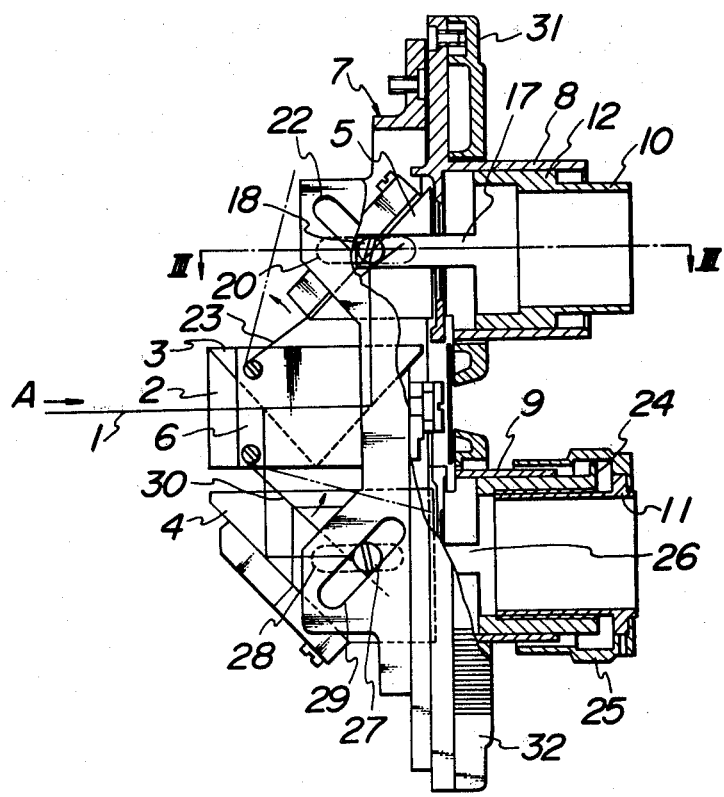
FIG. 2 is a partially cutaway bottom view of a mechanism to maintain a constant body tube length in a binocular microscope according to the present invention.
Figure 3:
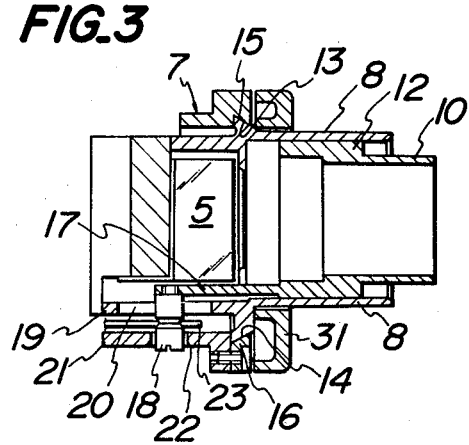
FIG. 3 is a sectional view taken along the line III—III of FIG. 2.

Referring to FIGS. 2 and 3 showing a preferred embodiment of the invention, the cemented prisms 2 and 3 are held by a holder frame 6 secured to a casing 7 of the microscope. The right and left prisms 4 and 5 are secured to outer frames 8 and 9 respectively, and the outer frames 8 and 9 are mounted on the casing 7 in a manner slidable in the width direction of the casing 7 (i.e., the vertical direction in FIG. 2). The outer frames 8 and 9 slidably carry left and right ocular sleeves 10 and 11, so that the ocular sleeves 10 and 11 are slidable in the outer frames 8 and 9 in axial directions of the ocular sleeves 10 and 11 in parallel to the direction of the incident light to the cemented prisms 2 and 3 as shown by the arrow A of FIG. 1. Right and left ocular lenses are mounted on the ocular sleeves 10 and 11, but such lenses are not shown in FIG. 2.

In the illustrated embodiment, an objective lens (not shown) is held at a fixed distance from the cemented prisms 2 and 3, so that the body tube length from the objective lens to the ocular lens can be kept constant by maintaining the optical path length from the cemented prisms 2 and 3 to the ocular sleeve 10 or 11 constant.

The left ocular sleeve 10 has an outer sliding surface 12, which surface is in slidable contact with the inner surface of the outer frame 8 so as to allow the axial movement of the ocular sleeve 10. As can be seen from FIG. 3, male dovetails 13 and 14 are formed at the top and bottom of the outer frame 8 so as to extend in the width direction of the casing 7. The casing 7 has dovetail grooves 15 and 16 to receive the dovetails 13 and 14 of the outer frame 8. The ocular sleeve 10 has a rearwardly extending arm 17, and a pin 18 is fixed to the tip of the arm 17, which pin 18 extends in a radially outward direction of the ocular sleeve 10. The outer frame 8 has a rear extension 19, and a slot 20 is bored through the rear extension 19, which slot 20 has a major axis extending in the axial direction of the ocular sleeve 10. The casing 7 has a similar rear extension 21, and a linear cam groove 22 is bored through the rear extension 21, which groove 22 extends with an angle of 45° relative to the axial direction of the ocular sleeve 10. The slot 20 is disposed above the linear cam groove 22, and the pin 18 secured to the ocular sleeve 10 movably fits in both the slot 20 and the linear cam groove 22. A rod-like resilient member 23 has one end thereof fixed to the holder frame 6 for the cemented prisms 2 and 3, while the opposite end of the rod-like resilient member 23 engages the pin 18 in the space between the rear extension 19 of the outer frame 8 and the rear extension 21 of the casing 7. The rod-like resilient member 23 urges the pin 18 in an axially rearward direction at a crossing of the slot 20 and the linear cam groove 22.

The construction of the right ocular sleeve 11 is similar to that of the left ocular sleeve 10 except the following points, so that only the different points will be described here. Firstly, an inner sleeve 24 is fitted in the outer frame 9 in a slidable manner in the axial direction thereof, and the ocular sleeve 11 is threadedly secured to the inside of the inner sleeve 24. In the embodiment of FIG. 2, a knob 25 is secured to the ocular sleeve 11 so as to facilitate manual adjustment of the position of the ocular sleeve 11 relative to the inner sleeve 24 by turning the ocular sleeve 11 along the thread thereof, whereby the view through the microscope is made adjustable. Secondly, a rearwardly extending arm 26 is integrally formed with the inner sleeve 24, and a pin 27 is secured to the extended end of the arm 26, which pin 27 projects radially outwardly relatively to the cylinder of the inner sleeve 24. The pin 27 slidably fits in a slot 28 formed on the outer frame 9, the slot 28 extending in the longitudinal axial direction of the outer frame 9. The pin 27 also slidably fits in a linear cam groove 29 formed on the casing 7 with an angle of 45° relative to the longitudinal axial direction of the ocular sleeve 11 on the opposite side to that of the linear cam groove 22 for the ocular sleeve 10. Thirdly, a rod-like resilient member 30 has one end thereof secured to the holder frame 6 and the opposite end thereof engaged with the pin 27 of the inner sleeve 24, so as to urge the pin 27 in an axially forward direction at a crossing of the slot 28 and the linear cam groove 29.

In FIG. 2, reference numerals 31 and 32 represent covers provided at the positions of the ocular sleeves 10 and 11. For instance, a rack and pinion mechanism (not shown) is mounted on the microscope so as to displace the two ocular sleeves 10 and 11 to the left and right in a symmetrical fashion.

The operation of the mechanism to maintain a constant body tube length with the aforesaid construction according to the present invention will be described now. To adjust the pupillary distance, at least one of the ocular sleeves 10 and 11 is displaced relative to the other by a desired distance. Such displacement is guided by the male dovetails 13, 14 of the left ocular sleeve 10 slidably fitted in the dovetail grooves 15, 16 of the casing 7 and by similar but unshown male dovetails and dovetail grooves for the right ocular sleeve 11. The displacements of the ocular sleeves 10 and 11 to the right and left are symmetrical as pointed out above. As the ocular sleeves 10 and 11 move relative to each other or in the width direction, the pins 18 and 27 connected to the ocular sleeves 10 and 11 move along the 45° inclined linear cam grooves 22 and 29 of the casing 6, so as to cause the ocular sleeves 10 and 11 to move in the longitudinal axial direction thereof. As a result, when the ocular sleeves 10 and 11 move by a certain distance in the width direction, they are forced to move in the longitudinal axial direction by the same distance, so as to maintain the constant body tube length in principle.

If, however, there should be backlashes between the linear cam grooves 22, 29 and the pins 18, 27 either in the width direction or in the longitudinal axial direction, it becomes impossible to establish complete coincidence of the width direction displacements of the ocular sleeves 10 and 11 with the axial direction displacements thereof. Consequently, it becomes impossible to maintain the constant body tube length.

Figure 4:
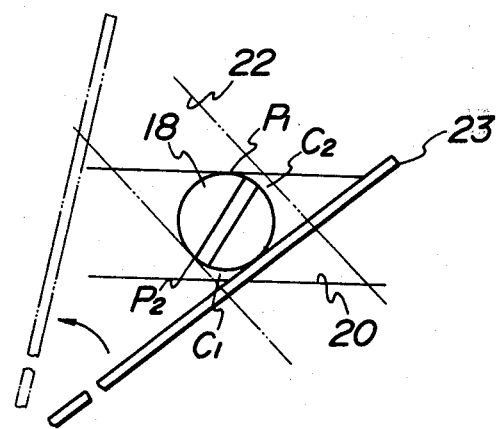
FIGS. 4 and 5 are schematic views of means to register pins of two ocular sleeves in the mechanism of FIGS. 2 and 3.

To solve the aforesaid difficulty, the present invention uses an arrangement in which the pins 18 and 27 engage not only the linear cam grooves 22 and 29 but also the slots 20 and 28, so as to ensure accurate register of the pins 18 and 27 at the crossings of the linear cam grooves 22, 29 and the slots 20, 28. Whereby, the backlashes of the pins 18 and 27 are minimized. In addition, the rod-like resilient members 23 and 30 act on the pins 18 and 27, so that even when there should be any gaps between the pins 18 and 27 and the slots 20 and 28 and between the pins 18 and 27 and the linear cam grooves 22 and 29, the pins 18 and 27 are completely freed from the backlashes. More specifically, referring to FIG. 4, the rod-like resilient member 23 urges the pin 18 in an upper leftward direction. Thus, the pin 18 engages the slot 20 and the linear cam groove 22 at one point $P_1$ on the upper edge of the slot 20 and at one point $P_2$ on the lower edge of the linear cam groove 22. Such engagement is maintained even when there are gaps $C_1$ and $C_2$ between the pin 18 and the lower edge of the slot 20 and between the pin 18 and the upper edge of the linear cam groove 22.

Figure 5:
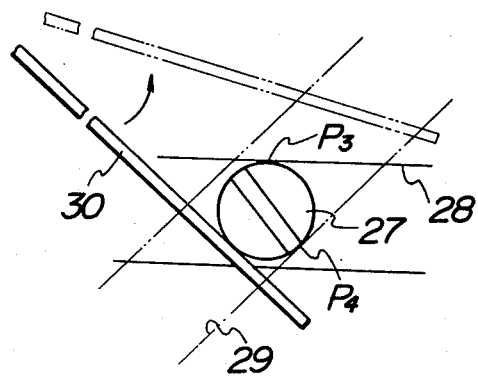

Similar arrangement is provided for the pin 27. Referring to FIG. 5, the rod-like resilient member 30 urges the pin 27 in an upper rightward direction, so that the pin 27 engages the slot 28 and the linear cam groove 29 at one point $P_3$ on the upper edge of the slot 28 and at one point $P_4$ on the lower edge of the linear cam groove 29.

Furthermore, the axial direction component of the force of the rod-like resilient member 23 acting on the pin 18 is selected to be opposite to the similar component of the force of the rod-like resilient member 30 acting on the pin 27, so that the axial direction components of the forces of the rod-like resilient members 23 and 30 do not affect the adjustment of pupillary distance by moving the ocular sleeves 10 and 11 toward or away from each other.

As described in the foregoing, according to the present invention, the backlashes of the ocular sleeves can be completely eliminated by using a simple mechanism, without causing any adverse effects on the operability of binocular microscope.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A mechanism to maintain a constant body tube length of a binocular microscope having a casing with two outer frames mounted thereon in a slidable manner in a width direction of the microscope, two ocular sleeves carried by said outer frames in a manner slidable in an axial direction thereof, oppositely slanted linear cam grooves bored on said casing with angles of 45° relative to said axial direction, and pins connected to said ocular sleeves and fitted in said linear cam grooves respectively, said ocular sleeves being adapted to slide axially relative to the outer frames in response to symmetrical widthwise sliding of said outer frames relative to the casing so as to maintain said body tube length constant; said mechanism comprising slots bored through said outer frames so as to extend in the axial direction thereof and to slidably receive said pins connected to said ocular sleeves, and resilient means disposed between said casing and said ocular sleeves so as to apply axial forces to said two ocular sleeves in opposite directions.

2. A mechanism as set forth in claim 1, wherein said resilient means applies said axial forces to each of said pins at portions between said linear cam grooves and said slots.

3. A mechanism as set forth in claim 1, wherein said resilient means is formed of two rod-like resilient members, each of which resilient members having one end thereof secured to said casing and an opposite end thereof engaged with corresponding one of said pins.

4. A mechanism as set forth in claim 3, wherein said forces being applied to said pins by said rod-like resilient members have oppositely directed axial components.

5. A mechanism as set forth in claim 3, wherein each of said rod-like resilient members causes corresponding one of said pins to engage said slot at one point and to engage said linear cam groove at one point.

* * * * *